US009608245B2

(12) United States Patent
DeKeuster et al.

(10) Patent No.: US 9,608,245 B2
(45) Date of Patent: Mar. 28, 2017

(54) SYSTEM FOR PROVIDING STRUCTURAL INTEGRITY OF A BATTERY MODULE

(71) Applicant: Johnson Controls Technology Company, Holland, MI (US)

(72) Inventors: Richard M. DeKeuster, Racine, WI (US); Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 163 days.

(21) Appl. No.: 14/501,971

(22) Filed: Sep. 30, 2014

(65) Prior Publication Data

US 2016/0093850 A1 Mar. 31, 2016

(51) Int. Cl.
*H01M 2/10* (2006.01)
*H01M 10/42* (2006.01)
*H01M 2/20* (2006.01)
*B60L 11/18* (2006.01)

(52) U.S. Cl.
CPC ....... *H01M 2/1077* (2013.01); *H01M 2/1083* (2013.01); *H01M 2/206* (2013.01); *B60L 11/1877* (2013.01); *H01M 2/1094* (2013.01); *H01M 10/425* (2013.01); *H01M 2200/00* (2013.01); *H01M 2220/20* (2013.01)

(58) Field of Classification Search
CPC .. H01M 2/1077; H01M 2/1083; H01M 2/206; H01M 2/1094; H01M 10/425; H01M 2200/00; H01M 2220/20; B60L 11/1877
See application file for complete search history.

(56) References Cited

U.S. PATENT DOCUMENTS

| | | | | |
|---|---|---|---|---|
| 1,938,214 A | * | 12/1933 | Boeye | H01M 6/44 |
| | | | | 206/705 |
| 5,143,283 A | * | 9/1992 | Lancaster | B65D 5/445 |
| | | | | 206/320 |
| 5,283,137 A | | 2/1994 | Ching | |
| 5,492,779 A | | 2/1996 | Ronning | |
| 5,686,202 A | | 11/1997 | Hooke et al. | |
| 6,183,903 B1 | | 2/2001 | Campbell et al. | |
| 6,300,003 B1 | | 10/2001 | Misra et al. | |
| 6,572,999 B1 | | 6/2003 | Stocchiero | |
| 7,297,438 B2 | * | 11/2007 | Kimoto | F28D 15/0275 |
| | | | | 429/120 |
| 7,323,271 B2 | | 1/2008 | Marraffa | |
| 7,332,243 B2 | | 2/2008 | Cummins et al. | |

(Continued)

FOREIGN PATENT DOCUMENTS

CN 200944407 Y 9/2007
CN 101944580 A 1/2011
(Continued)

OTHER PUBLICATIONS

PCT/US2015/046930 International Search Report and Written Opinion dated Jan. 27, 2016.

*Primary Examiner* — Gregg Cantelmo
(74) *Attorney, Agent, or Firm* — Fletcher Yoder P.C.

(57) ABSTRACT

A battery module includes a housing configured to receive a plurality of electrochemical cells, a skeletal frame coupled with the housing, and a framework disposed proximate to the skeletal frame. Moreover, the framework is substantially aligned with the skeletal frame and configured to transfer a force applied to the framework to the skeletal frame.

12 Claims, 8 Drawing Sheets

(56) References Cited

U.S. PATENT DOCUMENTS

| | | |
|---|---|---|
| 7,597,992 B2 | 10/2009 | Kanai et al. |
| 7,705,559 B2 | 4/2010 | Powell et al. |
| 7,816,029 B2 | 10/2010 | Takamatsu et al. |
| 7,883,793 B2 | 2/2011 | Niedzwiecki et al. |
| 7,910,243 B2 | 3/2011 | Koh et al. |
| 7,955,729 B2 | 6/2011 | Onuki et al. |
| 7,964,303 B2 | 6/2011 | Takeshita et al. |
| 8,053,104 B2 | 11/2011 | Kim |
| 8,067,111 B2 | 11/2011 | Koetting et al. |
| 8,235,732 B2 | 8/2012 | Garascia et al. |
| 8,453,778 B2 | 6/2013 | Bannier et al. |
| 8,496,081 B2 | 7/2013 | Meier et al. |
| 8,530,069 B2 | 9/2013 | Wood et al. |
| 8,540,282 B2 | 9/2013 | Yoda et al. |
| 8,551,643 B2 | 10/2013 | Takeshita et al. |
| 8,591,242 B2 | 11/2013 | Heinzen et al. |
| 8,632,902 B2 | 1/2014 | Wendorf et al. |
| 8,642,192 B2 | 2/2014 | Lee et al. |
| 8,647,762 B2 | 2/2014 | Schwab et al. |
| 8,728,648 B2 | 5/2014 | Choo et al. |
| 8,734,982 B2 | 5/2014 | Park et al. |
| 8,795,872 B2 | 8/2014 | Tople et al. |
| 8,795,873 B2 | 8/2014 | Ahn |
| 8,808,893 B2 | 8/2014 | Choo et al. |
| 8,808,896 B2 | 8/2014 | Choo et al. |
| 2001/0049056 A1 | 12/2001 | Saito et al. |
| 2002/0015880 A1 | 2/2002 | Heimer |
| 2002/0150822 A1 | 10/2002 | Marlow et al. |
| 2003/0017383 A1* | 1/2003 | Ura ............ F28D 15/0275 429/120 |
| 2007/0231687 A1 | 10/2007 | Kim et al. |
| 2008/0003494 A1 | 1/2008 | Rejman |
| 2008/0131767 A1 | 6/2008 | Kim |
| 2008/0160397 A1 | 7/2008 | Singleton et al. |
| 2008/0283317 A1* | 11/2008 | Wagner ............ B60R 16/04 180/68.5 |
| 2009/0111018 A1 | 4/2009 | Park et al. |
| 2010/0035145 A1 | 2/2010 | Kim et al. |
| 2010/0173191 A1 | 7/2010 | Meintschel et al. |
| 2011/0003193 A1 | 1/2011 | Park et al. |
| 2011/0008653 A1 | 1/2011 | Yoon et al. |
| 2011/0129703 A1 | 6/2011 | Han |
| 2011/0195284 A1 | 8/2011 | Yasui et al. |
| 2011/0223468 A1* | 9/2011 | Ferber, Jr. ............ H01M 2/206 429/160 |
| 2011/0293978 A1 | 12/2011 | Kim |
| 2011/0294000 A1 | 12/2011 | Kim et al. |
| 2011/0305930 A1 | 12/2011 | Han |
| 2011/0305957 A1 | 12/2011 | Wakatabe et al. |
| 2012/0088146 A1 | 4/2012 | Byun |
| 2012/0094158 A1 | 4/2012 | Wuensche |
| 2012/0121956 A1* | 5/2012 | Park ............ H01M 2/0287 429/99 |
| 2012/0175177 A1 | 7/2012 | Lee et al. |
| 2012/0202093 A1 | 8/2012 | Heo |
| 2012/0208046 A1 | 8/2012 | Koh |
| 2012/0263983 A1 | 10/2012 | Yoon et al. |
| 2012/0270095 A1 | 10/2012 | Kim |
| 2012/0282496 A1 | 11/2012 | Schaefer |
| 2012/0316477 A1 | 12/2012 | Hamaya et al. |
| 2013/0123875 A1 | 5/2013 | Varady et al. |
| 2013/0143098 A1 | 6/2013 | Huang et al. |
| 2013/0224530 A1 | 8/2013 | Baek et al. |
| 2013/0249243 A1 | 9/2013 | Lee et al. |
| 2013/0273415 A1 | 10/2013 | Lee et al. |
| 2014/0014418 A1 | 1/2014 | Komaki et al. |
| 2014/0120391 A1 | 5/2014 | Park |

FOREIGN PATENT DOCUMENTS

| | | |
|---|---|---|
| CN | 203386827 U | 1/2014 |
| EP | 1096590 A1 | 5/2001 |
| JP | H08329973 A | 12/1996 |
| JP | 2012009244 A | 1/2012 |
| JP | 2013026090 A * | 2/2013 |
| KR | 20120137700 A | 12/2012 |
| WO | 2013109014 A1 | 7/2013 |

* cited by examiner

SYSTEM FOR PROVIDING STRUCTURAL INTEGRITY OF A BATTERY MODULE

BACKGROUND

The present disclosure relates generally to the field of batteries and battery modules. More specifically, embodiments of the present disclosure relate to a retention structure for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules may be subject to external forces (e.g., uneven terrain, terrain inclines, unintentional impingements) during normal and abnormal operation conditions. As such, a system for providing structural rigidity to the battery module is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module including a housing configured to receive a plurality of electrochemical cells, a skeletal frame coupled with the housing, and a framework disposed proximate to the skeletal frame. In certain embodiments, the framework is substantially aligned with the skeletal frame and configured to transfer a force applied to the framework to the skeletal frame.

The present disclosure also relates to a battery module including a housing configured to receive a plurality of electrochemical cells, a skeletal frame of the housing, and a lid coupled to a top side of the housing. The lid is configured to enclose components of the battery module within the housing. The battery module also includes a lip formed on the top side of the housing. In certain embodiments, the lip extends away from the housing in a first direction and is integral with or engaged with the skeletal frame. Furthermore, the battery module includes a shoulder formed on the top side of the housing. The shoulder is coupled to the lip and forms a recess configured to receive the lid.

The present disclosure further relates to a battery module including a housing configured to receive a plurality of electrochemical cells and a housing lip formed on a front side of the housing. In certain embodiments, the housing lip extends laterally away from the housing. The battery module also includes an e-carrier disposed proximate to the housing within a perimeter of the housing lip, a bus bar configured to electrically couple the plurality of electrochemical cells to one another, and a framework integrally formed with or coupled to the e-carrier. The framework is coupled to the bus bar and configured to substantially align with a skeletal frame of the housing. The battery module includes a front cover disposed proximate to the housing lip. In certain embodiments, the front cover is configured to enclose the e-carrier, the bus bar, and the framework within the housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 volt lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 volts, for example, up to 48, 96, or 130 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical power to electrical devices in the vehicle. Additionally, as both operate over a period of time, the operational parameters may change. For example, the temperature of the lithium ion battery may increase the longer the lithium ion battery is in operation.

Accordingly, to simplify the following discussion, the present techniques will be described in relation to a battery system with a 12 volt lithium ion battery and a 12 volt lead-acid battery. However, one of ordinary skill in art should be able to adapt the present techniques to other battery systems, such as a battery system with a 48 volt lithium ion battery and a 12 volt lead-acid battery.

Battery modules in accordance with the present disclosure may be mounted to the frame of a vehicle. For example, the trunk may include an indentation to accommodate the battery module. Furthermore, a cage may surround the battery module, while installed, to provide additional protection from external forces, such as forces associated with travel along uneven terrain or unintentional impingements. It may be desirable to secure the battery module to the vehicle, for example, to reduce wear on the electronic components coupled to the battery module and to provide structural support to the battery module.

Battery modules, in accordance with the present disclosure may include a framework configured to absorb and/or redirect external forces applied to the battery module. For example, the framework may be positioned within, around, or integral with the housing and configured to receive external forces applied to the housing. Furthermore, in certain embodiments, other rigidity features may be incorporated into the housing to provide a rigid structure to secure and protect the electrochemical cells.

Accordingly, the battery module may include the framework secured to the housing to absorb external forces applied to the housing. For example, the framework may be positioned proximate to a skeletal frame surrounding the electrochemical cells to protect the cells from external forces and/or damage. Moreover, the framework may be configured to substantially align with the skeletal frame. To that end, forces applied to the framework will be directed into the skeletal frame, as opposed to into the electrochemical cells or weaker aspects of the housing. Furthermore, in other embodiments, the housing may include rigidity features incorporated into the housing. For example, the rigidity features may include truss like members disposed along the housing to increase the structural rigidity of the housing while reducing the overall weight of the housing.

Figure 1:
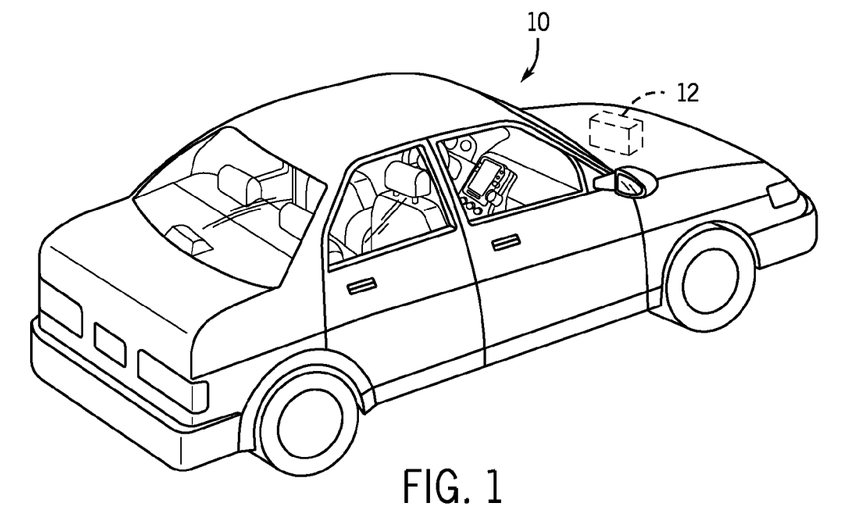
FIG. 1 is a perspective view of a vehicle having a battery module configured in accordance with present embodiments to provide power for various components of the vehicle.

With the foregoing in mind, present embodiments relate to retention structures and associated components applied to any battery or battery system, in particular battery systems employed in an xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
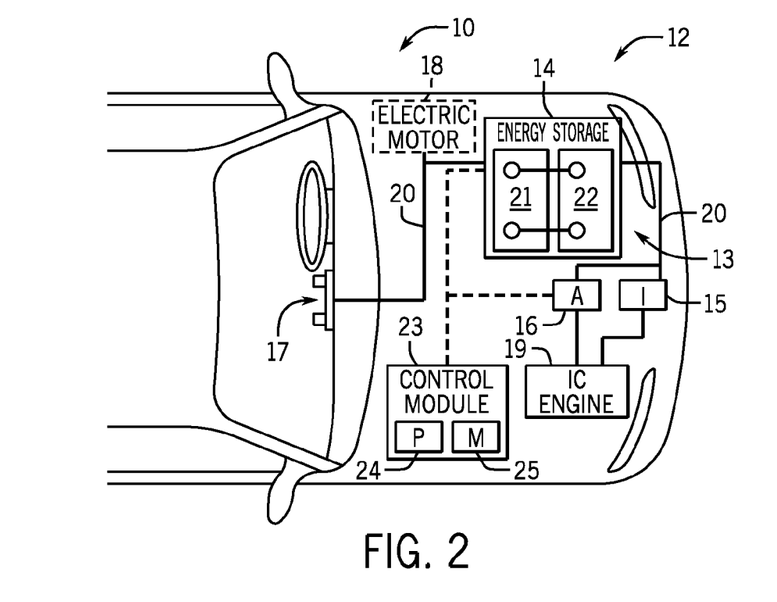
FIG. 2 is a schematic view of the vehicle depicted in FIG. 1 a battery system in the vehicle, in accordance with an embodiment of the present approach.

A more detailed view of the battery system 12 is described in FIG. 2. As depicted, the battery system 12 includes an energy storage component 14 coupled to an ignition system 15, an alternator 16, a vehicle console 27, and optionally to an electric motor 18. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 17 and the ignition system 15, which may be used to start (e.g., crank) the internal combustion engine 19.

Additionally, the energy storage component 14 may capture electrical energy generated by the alternator 16 and/or the electric motor 18. In some embodiments, the alternator 16 may generate electrical energy while the internal combustion engine 19 is running. More specifically, the alternator 16 may convert the mechanical energy produced by the rotation of the internal combustion engine 19 into electrical energy. Additionally or alternatively, when the vehicle 10 includes an electric motor 18, the electric motor 18 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 16 and/or the electric motor 18 during regenerative braking. As such, the alternator 16 and/or the electric motor 18 are generally referred to herein as a regenerative braking system.

To facilitate capturing and supplying electric energy, the energy storage component 14 may be electrically coupled to the vehicle's electric system via a bus 20. For example, the bus 20 may enable the energy storage component 14 to receive electrical energy generated by the alternator 16 and/or the electric motor 18. Additionally, the bus 20 may enable the energy storage component 14 to output electrical energy to the ignition system 15 and/or the vehicle console 17. Accordingly, when a 12 volt battery system 12 is used, the bus 20 may carry electrical power typically between 8-18 volts.

Additionally, as depicted, the energy storage component 14 may include multiple battery modules 13. For example, in the depicted embodiment, the energy storage component 14 includes a lithium ion (e.g., a first) battery module 21 and a lead-acid (e.g., a second) battery module 22, which each includes one or more battery cells. In other embodiments, the energy storage component 14 may include any number of battery modules 13. Additionally, although the lithium ion battery module 21 and lead-acid battery module 22 are depicted adjacent to one another, they may be positioned in different areas around the vehicle. For example, the lead-acid battery module 22 may be positioned in or about the interior of the vehicle 10 while the lithium ion battery module 21 may be positioned under the hood of the vehicle 10.

In some embodiments, the energy storage component 14 may include multiple battery modules to utilize multiple different battery chemistries. For example, when the lithium ion battery module 21 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 23. More specifically, the control module 23 may control operations of components in the battery system 12, such as relays (e.g., switches) within energy storage component 14, the alternator 16, and/or the electric motor 18. For example, the control module 23 may regulate amount of electrical energy captured/supplied by each battery module 21 or 22 (e.g., to de-rate and re-rate the battery system 12), perform load balancing between the battery modules 21 and 22, determine a state of charge of each battery module 21 or 22, determine temperature of each battery module 21 or 22, control voltage output by the alternator 16 and/or the electric motor 18, and the like.

Accordingly, the control module (e.g., unit) 23 may include one or processor 24 and one or more memory 25. More specifically, the one or more processor 24 may include one or more application specific integrated circuits (ASICs), one or more field programmable gate arrays (FPGAs), one or more general purpose processors, or any combination thereof. Additionally, the one or more memory 25 may include volatile memory, such as random access memory (RAM), and/or non-volatile memory, such as read-only memory (ROM), optical drives, hard disc drives, or solid-state drives. In some embodiments, the control unit 23 may include portions of a vehicle control unit (VCU) and/or a separate battery control module.

Furthermore, as depicted, the lithium ion battery module 21 and the lead-acid battery module 22 are connected in parallel across their terminals. In other words, the lithium ion battery module 21 and the lead-acid battery module 22 may be coupled in parallel to the vehicle's electrical system via the bus 20.

Figure 3:
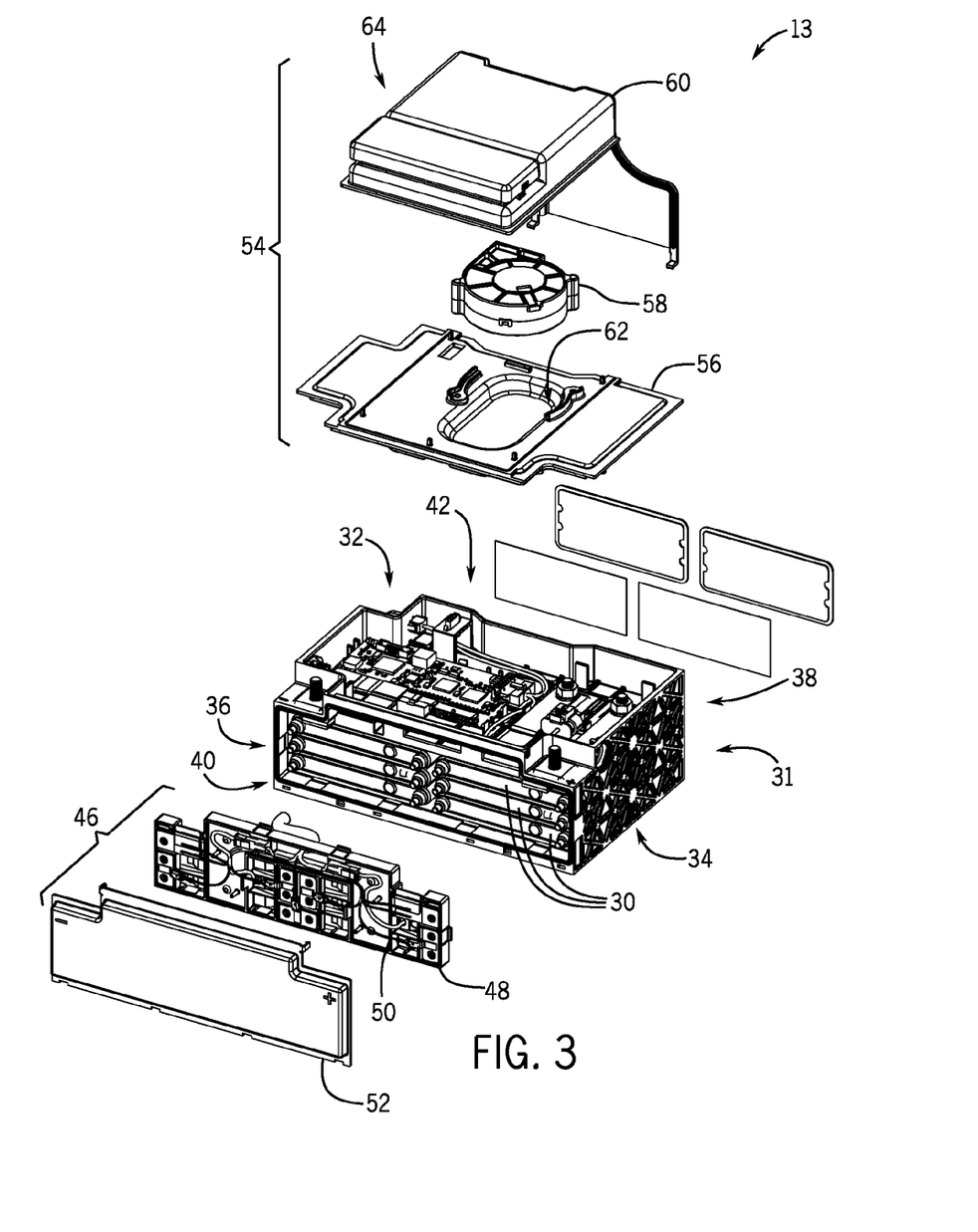
FIG. 3 is a partially exploded perspective view of an embodiment of a battery module for use in the vehicle of FIG. 1.

A partially exploded perspective view of one exemplary battery module 13 in accordance with the present disclosure is shown in FIG. 3. In the illustrated embodiment, the battery module 13 includes a number of individual electrochemical cells 30 (e.g., Li-ion electrochemical cells, battery cells, cells) housed in a housing 31 of the battery module 13. In certain embodiments, the electrochemical cells 30 are prismatic cells arranged in a stacked configuration. However, in other embodiments, the electrochemical cells 30 may be cylindrical, oblong, or the like according to the energy density and size constrains for the battery module 13. The housing 31 includes a top side 32 (e.g., top wall), a bottom side 34 (e.g., bottom wall), and two reinforcing sides 36, 38 (e.g., reinforcing walls). The housing 31 also includes a front side 40 (e.g., front wall) and a back side 42 (e.g., back wall). It should be noted that the top side 32, the bottom side 34, the two reinforcing sides 36, 38, the front side 40, and the back side 42 (or walls) may be, depending on the embodiment, disposed in any orientation with respect to the vehicle 10. The terms top, bottom, and sides should be construed as relative terms that relate to the orientation, position, or location of the various components (e.g., walls) of the battery module 13 with respect to other components of the battery module 13. Indeed, presently disclosed embodiments may be applicable to any battery module 13 having the same or different configuration and/or orientation described above and in detail below. One of ordinary skill in the art would recognize that the components and examples used to describe battery modules 13 in accordance with the present disclosure should not be construed to limit the present disclosure to those components and examples alone. Rather, the disclosed examples are merely intended to serve as non-limiting examples to facilitate discussion of the present disclosure.

The front side 40 of the housing 31, in the illustrated embodiment, is covered by a panel 46. In certain embodiments, the panel 46 includes a snap on e-carrier 48, which may be utilized, for example, to establish electrical connections between the electrochemical cells 30. In the illustrated embodiment, the e-carrier 48 includes an integrated bus bar 50 configured to electrically couple the electrochemical cells 30. The front side 40 of the housing 31 may be further covered by a front cover 52, which may be coupled to the e-carrier 48 or to one or more portions or components of the housing 31 itself. Further, a cover assembly 54 may fit over the top side 32 (e.g., top wall).

In accordance with the present disclosure, the cover assembly 54 includes an interior cover 56, a fan 58, and a lid 60. The interior cover 56 is configured to couple to the housing 31 and encloses the electrochemical cells 30 within the housing 31. In the illustrated embodiment, the fan 58 is mounted proximate to the interior cover 56 and is configured to direct cooling air through the battery module 13. For example, the fan 58 may direct air through a cooling channel 62 through the battery module 13 to regulate the temperature of the electrochemical cells 30. However, in other embodiments, the fan 58 may be mounted on a side 36, 38 of the battery module, or not included in the battery module 13.

Figure 4:
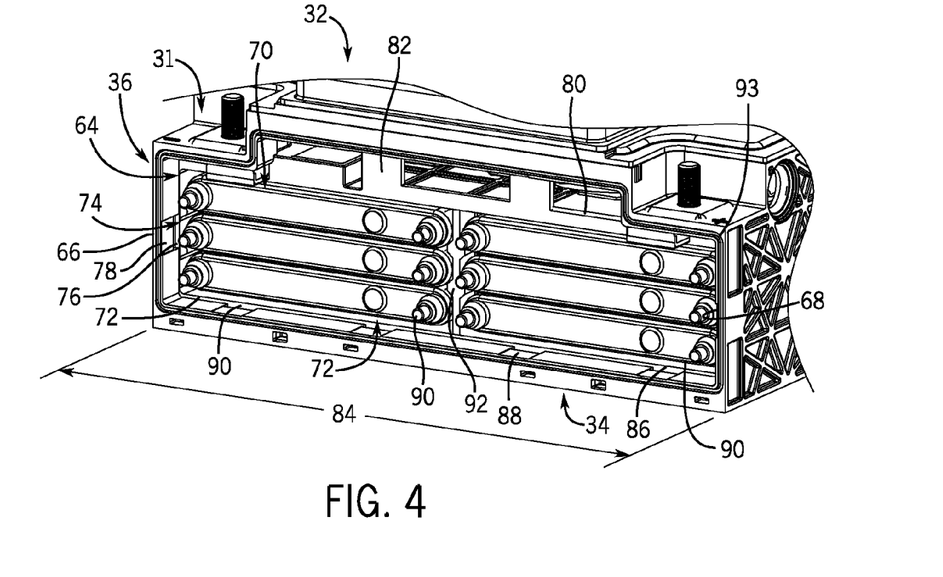
FIG. 4 is a perspective view of a portion of the battery module of FIG. 3 with a panel removed, in accordance with an aspect of the present disclosure.

FIG. 4 is a perspective view of an embodiment of the battery module 13 with the panel 46 removed for clarity. A skeletal frame 64 is incorporated into the housing 31 to absorb and/or deflect external forces applied to the battery module 13. In certain embodiments, the skeletal frame 64 is formed from a more robust material than the housing 31. For example, the skeletal frame 64 may be a metal or metal alloy with a high modulus of elasticity configured to withstand a large external force while the housing is formed from a polymer with a lower modulus of elasticity. In the illustrated embodiment, the skeletal frame 64 surrounds the electrochemical cells 30. For instance, a first edge 66 and a second edge 68 of the skeletal frame 64 are arranged along outer sides of the electrochemical cells 30. Moreover, the skeletal frame 64 further includes an upper edge 70 and a lower edge 72. As a result, the skeletal frame 64 substantially surrounds the electrochemical cells 30 to provide protection from external forces.

As shown, the first outer edge 66 includes recesses 74 configured to receive the electrochemical cells 30. Moreover, in certain embodiments, free spaces are arranged between walls forming the recess 74 and the electrochemical cells 30. The free spaces may enable growth and/or expansion of the electrochemical cells 30 (e.g., due to temperature increases) and also enable movement of the electrochemical cells 30 without impinging against the skeletal frame 64. The first edge 66 includes a first edge projection 76 extending laterally toward the side 36. The first edge projection 76 is engaged with a side slot 78 disposed in the housing 31. By engaging the side slot 78 with the first edge projection 76, the skeletal frame 64 is secured within the housing 31. Moreover, the side slot 78 may include features configured to stop the insertion of the skeletal frame 64 when the skeletal frame 64 reaches a desired position. For example, the side slot 78 may include a stop feature that prevents further insertion of the skeletal frame 64. While not shown in FIG. 4, the second edge 68 may include a second edge projection engaged with a second side slot to secure the skeletal frame 64 to the housing 31.

The upper edge 70 of the skeletal frame 64 includes an upper surface 80 and an upper extension 82. The upper surface 80 extends substantially across a width 84 of the housing 31. That is, the upper surface 80 is configured to extend at least over the electrochemical cells 30. In certain embodiments, a space is positioned between the upper surface 80 and the electrochemical cells 30. As discussed above, the space enables expansion of the electrochemical cells 30 without impingement between the upper surface 80 and the electrochemical cells 30. The upper extension 82 is configured to extend toward the top side 32 of the housing 31 and to contact the housing 31. In certain embodiments, the upper extension 82 is configured to align with a slot or groove to secure the skeletal frame 64 to the housing 31.

The lower edge 72 is arranged opposite the upper edge 70, proximate to the bottom side 34 of the housing 31. In the illustrated embodiment, the lower edge 72 includes lower edge projections 86 coupled to lower slots 88 of the housing 31. Engagement of the lower slots 88 by the lower edge projections 86 secures the skeletal frame 64 within the housing 31. In certain embodiments, the lower slots 88 and the lower edge projections 86 extend substantially along a length of the housing 31. However, in other embodiments, the lower slots 88 and lower edge projections 86 only extend along a portion of the housing 31. Moreover, in certain embodiments, the lower edge projections 86 may be configured to engage clips to lock the skeletal frame 64 into the housing 31.

As shown in FIG. 4, the lower edge 72 includes a plurality of lower edge segments 90 disposed across the width 84 of the housing 31. In the illustrated embodiment, the outermost lower edge segments 90 are coupled to the first edge 66 and the second edge 68. Moreover, in the illustrated embodiment, the central lower edge segment 90 is coupled to the upper extension 82 via a central strut 92. While the illustrated embodiment shows three lower edge segments 90, in certain embodiments 1, 2, 4, 5, 6, or any suitable number of lower edge segments 90 may be used to facilitate securing the skeletal frame 64 to the housing 31. It should be noted that extensions of the skeletal frame 64 or intervening features may connect the skeletal frame 64 to outer boundaries of the battery module 13 to encourage absorption or distribution of force applied to the battery module 13 via the skeletal frame 64. For example, intervening features may align with the first edge 66, second edge 68, and central strut 92 such that an impact to an outer side of the battery module 13 will mostly transfer force to the skeletal frame 64 via the intervening features (e.g., a framework).

The central strut 92 is arranged between the upper extension 82 and the lower edge 72. In the illustrated embodiment, the central strut 92 is positioned at substantially a halfway point of the width 84 of the housing 31. The central strut 92 separates two columns of stacked electrochemical cells 30 and provides a structural support for the housing 31 along a length of the housing 31. However, in other embodiments, the central strut 92 may not be included. For example, the first edge 66, second edge 68, upper edge 70, and/or lower edge 72 may provide sufficient support for the electrochemical cells 30 within the housing 31.

In the illustrated embodiment, a housing lip 93 is arranged along a perimeter of the front side 40 of the housing 31. The housing lip 93 is configured to extend beyond the front side 40 of the housing 31. As a result, the housing lip 93 forms an opening configured to receive the e-carrier 48. Moreover, the housing lip 93 may be configured to couple to the front cover 52 of the panel 46, thereby securing the front cover 52 to the housing 31. In certain embodiments, the housing lip 93 may be formed from a material having a greater modulus of elasticity than the housing 31. In other words, the housing lip 93 may be more structurally robust than other components of the housing 31. Accordingly, the housing lip 93 may be capable of absorbing and or withstanding a greater amount of force than other components of the housing 31.

Further, in some embodiments, the housing lip 93 may interact with or extend from the skeletal frame 64. Thus, the housing lip 93 may be configured to receive an external force applied to the housing 31.

In the illustrated embodiment, the skeletal frame 64 is offset and/or recessed into the housing 31. As will be described below, offsetting the skeletal frame 64 into the housing 31 enables the installation of a framework configured to direct external forces applied to the panel 46 toward the skeletal frame 64. As a result, a compact and robust battery module 13 may be developed without increasing the size of the housing 31.

Figure 5:
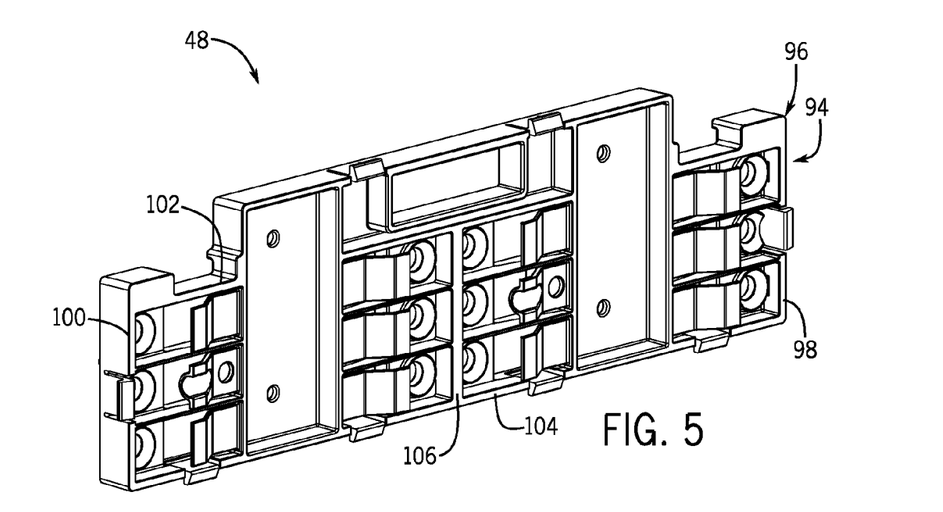
FIG. 5 is a perspective view of a back side of an e-carrier of the battery module of FIG. 3, in accordance with an aspect of the present disclosure.

FIG. 5 is a perspective view of a back side 94 of the e-carrier 48. The e-carrier 48 is a component of the battery module 13 that facilitates electrical connection between the electrochemical cells 30. For example, electronics and/or sensors may be mounted to the e-carrier 48. Furthermore, as will be described below, the e-carrier 48 may provide structural rigidity to the battery module 13. In the illustrated embodiment, a framework 96 is integrally formed with the e-carrier 48. In other embodiments, the framework 96 may not be part of the e-carrier 48, and may be a protrusion arranged between the e-carrier 48 and the skeletal frame 64. For example, the framework 96 may couple to the e-carrier 48 and/or the skeletal frame 64. In the illustrated embodiment, the framework 96 is configured to substantially align with the skeletal frame 64 of the housing 31 to transfer forces applied to the front cover 52 to the skeletal frame 64. As a result, the front cover 52 may be formed from a material with a lower modulus of elasticity, or be thinner, because external forces are transferred to the skeletal frame 64 instead of absorbed by the front cover 52. Moreover, in certain embodiments, the framework 96 supports components of the e-carrier 48. For example, the framework 96 may support the bus bar 50 and/or electronic components disposed on the e-carrier 48.

The dimensions of the e-carrier 48 in the illustrated embodiment are particularly set to align with the skeletal frame 64. For example, a first side 98 is configured to substantially align with the first edge 66. Moreover, a second side 100 substantially aligns with the second edge 68. Furthermore, a third side 102 substantially aligns with the upper edge 70, a fourth side 104 substantially aligns with the lower edge 72, and a center support 106 substantially aligns with the central strut 92. By aligning the framework 96 with the skeletal frame 64, external forces applied to the framework 96 may be transferred to the skeletal frame 64, instead of the housing 31. Accordingly, weaker components (e.g., relative to the skeletal frame 64) of the housing 31 may avoid the full impact of the external forces.

In certain embodiments, the framework 96 is formed from a pliable and/or semi-rigid material. For example, the framework 96 may be a polymer configured to deform or compress when acted upon by an external force (e.g., deform while enclosed within the housing 31). However, in other embodiments, the framework 96 may be made of a metal, elastomer, or other suitable materials capable of distributing an applied force to the skeletal frame 64. In certain embodiments, the framework 96 and/or e-carrier 48 may be constructed from two or more different materials. For example, the sides 98, 100, 102, 104 may be a metal while other components are formed from a polymer. In certain embodiments, the skeletal frame 64 is formed from a more rigid material (e.g., higher modulus) than the framework 96. For example, the skeletal frame 64 may be metallic while the framework 96 is plastic. As will be described below, the framework 96 is configured to bear against the skeletal framework 64 due to external forces acting upon the battery module 13.

Figure 6:
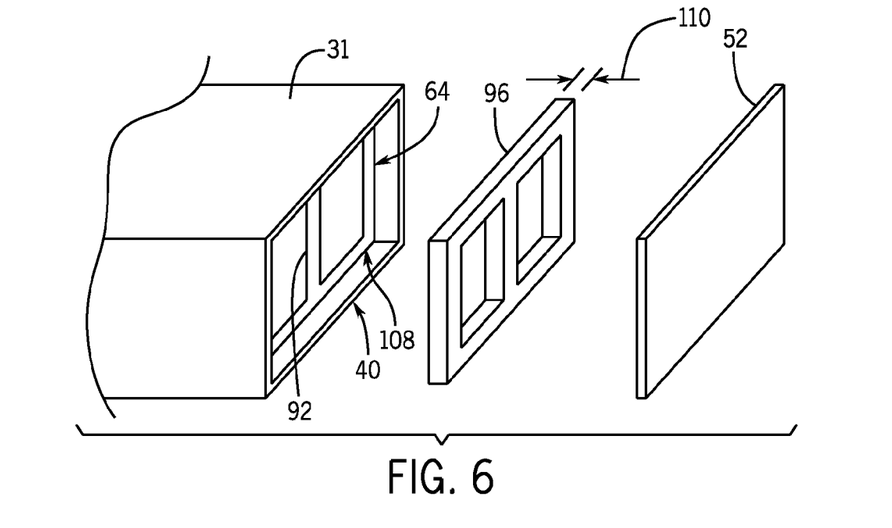
FIG. 6 is a partially exploded schematic perspective view of an embodiment of a panel coupled to a housing, in accordance with an aspect of the present disclosure.

FIG. 6 is a partially exploded schematic perspective view of the framework 96 arranged between the skeletal frame 64 and the front cover 52. As mentioned above, the framework 96 is configured to substantially align with the skeletal frame 64 to transfer external forces to the skeletal frame 64. For example, external forces applied to the front cover 52 may be transferred to the skeletal frame 64 via the framework 96 instead of being absorbed by other housing components. In this embodiment, the e-carrier 48 is a component of the front cover 52. Thus, as shown in the illustrated embodiment, the framework 96 is an insert separate from the e-carrier 48. The skeletal frame 64 is recessed into the housing 31, leaving a gap 108 at the front side 40 of the housing 31. In certain embodiments, a thickness 110 of the framework 96 is particularly selected to enable the framework 96 to sit within the gap 108, proximate to the skeletal frame 64. For example, the framework 96 may contact the skeletal frame 64. Furthermore, the thickness 110 of the framework 96 may fill the gap 108. However, in other embodiments, the framework 96 may project out of the gap 108, thereby extending past the housing 31. Moreover, the framework 96 may be fastened to the housing 31 via clips, fasteners, or the like. As shown, the front cover 52 is configured to couple to the housing 31 to secure the framework 96 and the e-carrier 48 within the housing 31. In certain embodiments, the front cover 52 may compress the framework 96 within the gap 108. However, in other embodiments, a space is retained between the framework 96 and the front cover 52. In certain embodiments, the battery module 13 may be arranged to anticipate likely impact directions. For example, the framework 96 may be oriented to face the back of the vehicle 10. Accordingly, external forces applied to the front cover 52 (e.g., from forces applied to the back of the vehicle 10) will be transferred to the framework 96 and the framework 96 will transfer the forces to the skeletal frame 64, thereby directing the external forces away from certain components of and within the housing 31.

Figure 7:
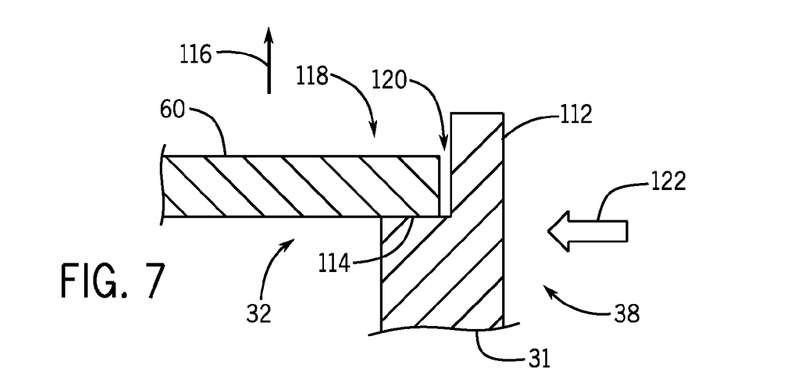
FIG. 7 is a schematic cross-sectional side view of an embodiment of a cover mounted to a housing of the battery module of FIG. 3, in accordance with an aspect of the present disclosure.

As mentioned above, the lid 60 is configured to mount to the top side 32 of the housing 31. In certain embodiments, the lid 60 is coupled to the housing 31 via fasteners (e.g., bolts, rivets, screws). However, in other embodiments, adhesives may be applied to the lid 60 and/or the housing 31 to couple the lid 60 to the housing 31. Furthermore, in certain embodiments, a weight of the lid 60 drives the lid 60 onto the housing 31. In other words, the lid 60 may be arranged on the top side 32 of the housing 31 without additional fasteners to secure the lid 60 to the housing 31. FIG. 7 shows a cross-sectional side view of the lid 60 mounted to the top side 32 of the housing 31. External forces applied to the housing 31 may induce movement of the lid 60. For example, direct force applied to the lid 60 may cause it to disengage from the housing 31. In the illustrated embodiment, the housing 31 includes a lip 112. The lip 112 extends from the housing 31 past the lid 60. In certain embodiments, the lip 112 is formed from a material that is more structurally robust than the lid 60. To that end, the lip 112 is configured to shield the lid 60 from external forces.

In the illustrated embodiment, the housing includes a shoulder 114 configured to support the lid 60. Moreover, the lip 112 extends in a first direction 116 from the shoulder 114, forming a recess 118 configured to receive the lid 60. In the illustrated embodiment, the first direction 116 is transverse (e.g., substantially perpendicular) to the lid 60. In the illustrated embodiment, the lid 60 does not contact the lip 112. Instead, a lid space 120 separates the lid 60 from the lip 112. The lid space 120 enables expansion and/or contraction of the lid 60 and/or the housing 31 without creating stress points along the lid 60. For example, the lid 60 may expand (e.g., due to temperature increases) without impinging against the lip 112. Also, the lid space 120 provides room for the lip 112 to be deformed toward the lid 60 without initiating contact with the lid 60. In certain embodiments, the lid space 120 extends about the perimeter of the lid 60.

As mentioned above, the lip 112 shields the lid 60 from external forces applied to the housing 31. For example, a force 122 contacting the housing 31 at the side 38 is blocked by the lip 112 from directly contacting the lid 60. Moreover, a force applied at a downward angle relative to the lid 60 may also be blocked (at least partially) by the lip 112. In certain embodiments, the lid 60 may shift within the recess 118, but the lip 112 may include features configured to block the lid 60 from popping up (e.g., moving in the first direction 116) and thereby exposing the interior of the housing 31. As a result, the lid 60 may be installed without fasteners and/or adhesives while still being protected from external forces by the lip 112. Furthermore, movement of the lid 60 may be substantially blocked in at least two directions. For instance, the lip 112 may substantially block side-to-side and front-to-back movement of the lid 60. Furthermore, movement in the first direction 116 may be blocked by the lip 112. Accordingly, assembly of the battery module 13 may be simplified by reducing the number of fasteners and/or connections made by operators. Moreover, access to the interior components of the battery module 13 may be easier in embodiments where the lid 60 is not coupled to the housing 31 by fasteners or adhesives. Furthermore, in certain embodiments, the lid 60 may be shaped in a particular configuration that blocks installation of the lid 60 within the recess 118 in an improper orientation, thereby reducing the likelihood that the battery module 13 is assembled improperly.

Furthermore, in certain embodiments, the battery module 13 may be oriented in a manner to accommodate likely impact directions. For example, the lid 60 may be placed on the top side 32 of the housing 31. As an example, the lid 60 at the top side 32 may be facing in an upward direction relative to a ground plane. In embodiments where likely impact directions come from the sides 36, 38, the orientation of the lid 60 on the top side 32 is configured to block the lid 60 from the external forces. For example, the lip 112 extends upward from the housing 31 around the lid edges to block external forces from directly impacting the lid 60.

Figure 8:
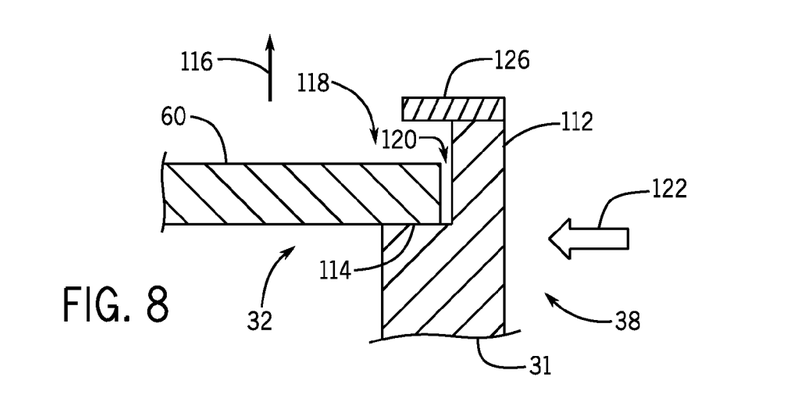
FIG. 8 is a schematic cross-sectional side view of a further embodiment of a cover mounted to a housing of the battery module of FIG. 3, in accordance with an aspect of the present disclosure.

FIG. 8 is a further embodiment of the lip 112 configured to shield the lid 60 from external forces 122 applied to the housing 31. In the illustrated embodiment, the lip 112 includes an arm 126 extending laterally over the lid 60. That is, the arm 126 is configured to partially overlap the lid 60. This is an example of embodiments discussed above that facilitate retention of the lid 60. Specifically, the arm 126 is configured to provide additional support to block the lid 60 from moving in the first direction 116. For example, the force 122 may contact the housing 31 at the side 38 and encourage the lid 60 to travel in the first direction 116 due to momentum. However, the arm 126 is configured to contact the lid 60 to block the lid 60 from moving in the first direction 116. In certain embodiments, the arm 126 may be positioned around the perimeter of the lid 60. However, in other embodiments, the arm 126 (essentially a plate or platform) may be positioned around a portion of the perimeter of the lid 60 (e.g., along two adjacent sides).

Figure 9:
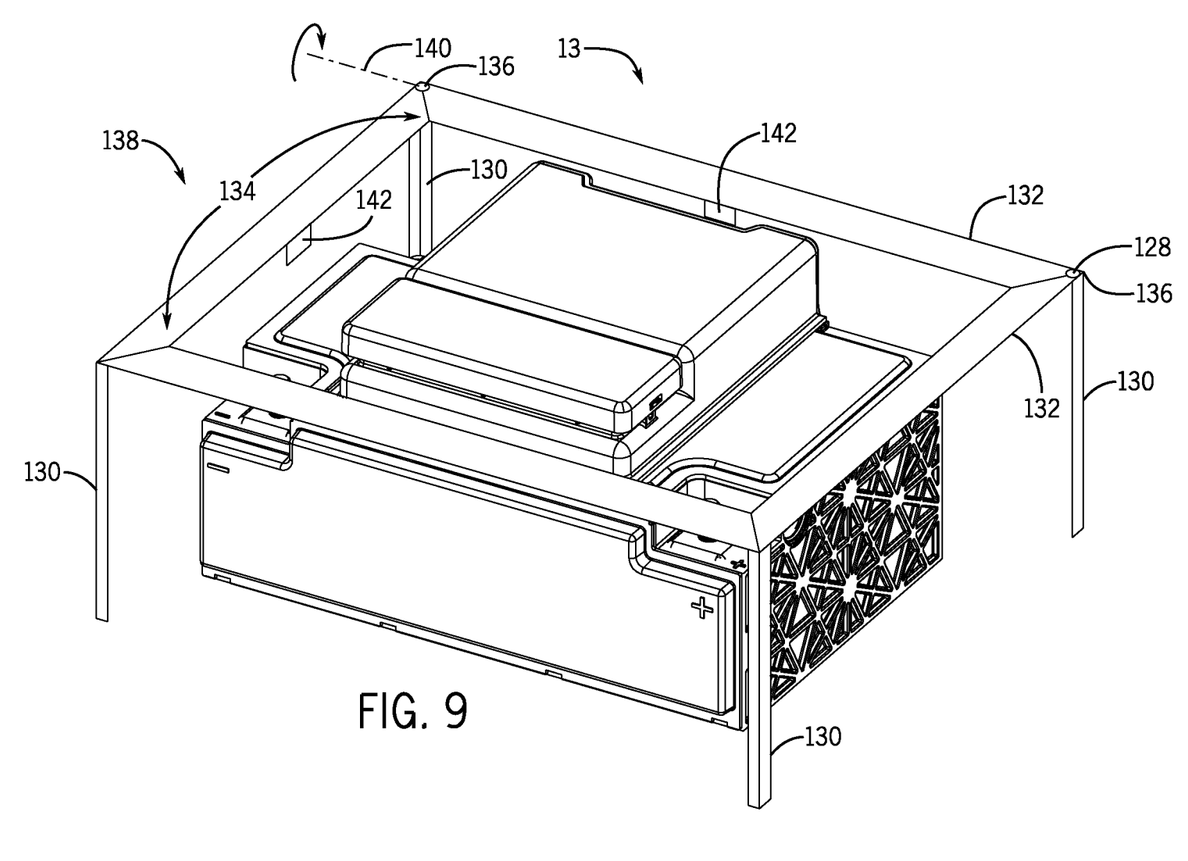
FIG. 9 is a perspective view of a housing of the battery module of FIG. 3 disposed within a cage, in accordance with an aspect of the present disclosure.

As discussed above, present embodiments are directed toward a system for providing structural integrity to the battery module 13. Accordingly, the system is configured to redirect external forces (e.g., force 122) away from sensitive areas of the housing 31 and toward more structurally rigid areas of the battery module 13. For example, FIG. 9 is a perspective view of the housing 31 positioned within a cage 128. The cage 128 is configured to surround the housing 31 and absorb the impact from external forces applied to the vehicle 10. For example, the cage 128 includes supports 130 coupling the cage 128 to the vehicle 10. Moreover, the supports 130 are coupled together via cross members 132. In certain embodiments, the supports 130 and/or the cross members 132 comprise square tubing. However, in other embodiments, cylindrical tubing, angle iron, I-beams, or the like may be used to construct the cage 128. Moreover, in certain embodiments, the cage 128 may be made of a metal or metal alloy. However, in other embodiments, the cage 128 may be a polymer, a composite material, or the like. Furthermore, the cage 128 includes crush assemblies 134 configured to deform when acted upon by a sufficient force. As used herein, the sufficient force describes a force capable of plastically deforming the cage 128. Deformation of the crush assemblies 134 acts to absorb forces applied it, thereby limiting or eliminating the force transferred to the battery module 13. That is, the battery module 13 may be substantially isolated from the sufficient force due to the cage 128. In the illustrated embodiment, the cage 128 is generally rectangular. However, in other embodiments, the cage 128 may be other shapes particularly selected to conform to design conditions (e.g., size of the vehicle, size of the battery module 13).

In the illustrated embodiment, the housing 31 is substantially surrounded by the cage 128. In certain embodiments, the cage 128 includes hinges 136 configured to pivot a top section 138 of the cage 128 about a hinge axis 140 in a pivot direction 141. Pivoting the top section 138 about the hinge axis 140 opens the cage 128, thereby enabling the operator to install the battery module 13 within the cage 128. Moreover, in certain embodiments, the cage 128 includes retention features 142 configured to couple the housing 31 to the cage 128. For example, the retention features 142 may engage corresponding features of the housing 31 to secure the housing 31 within the cage 128. It should be noted that aspects of the cage 128 may be aligned with, coupled to, or otherwise engage the skeletal frame 64 (e.g., via the framework 96) such that force transferred to the battery module 13 from the cage 128 will predominantly go into the skeletal frame 64 and not other components of the battery module 13.

Figure 10:
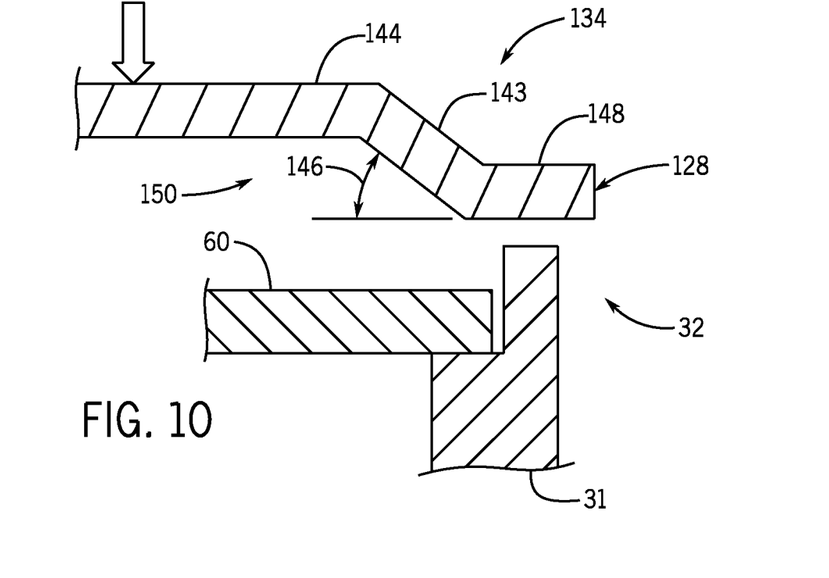
FIG. 10 is a schematic cross-sectional side view of a crush assembly of the cage of FIG. 9.

FIG. 10 is a cross-sectional side view of the crush assembly 134 of the cage 128. As mentioned above, the crush assembly 134 is positioned at the top side 32 of the housing 31. In certain embodiments, the crush assembly 34 is configured to conform to the shape of the lid 60. For example, the crush assembly 34 may include the same general profile as the lid 60, thereby preventing unintentional contact between the lid 60 and the cage 128. As will be described below, the crush assembly 134 is configured to deform when acted upon by the sufficient force.

The crush assembly 134 includes a beveled edge 143 arranged between cross members 132. The beveled edge 143 is configured to project a top cross member 144 away from the lid 60. That is, the beveled edge 143 is positioned at an angle 146, relative to the lid 60, to extend the top cross member 144 a greater vertical distance from the lid 60 than a lower cross member 148. As a result, a crush gap 150 is formed between the beveled edge 143 and the lid 60. In certain embodiments, the crush assembly 134 may deform into the crush gap 150 when acted upon by the sufficient force. By deforming into the crush gap 150, the crush assembly 134 is configured to absorb the energy of the external force, thereby protecting the housing 31. Also, an edge of the crush assembly 134 may extend beyond a lateral edge of the housing 31 to provide an advanced target for forces that may come from the side.

Figure 11:
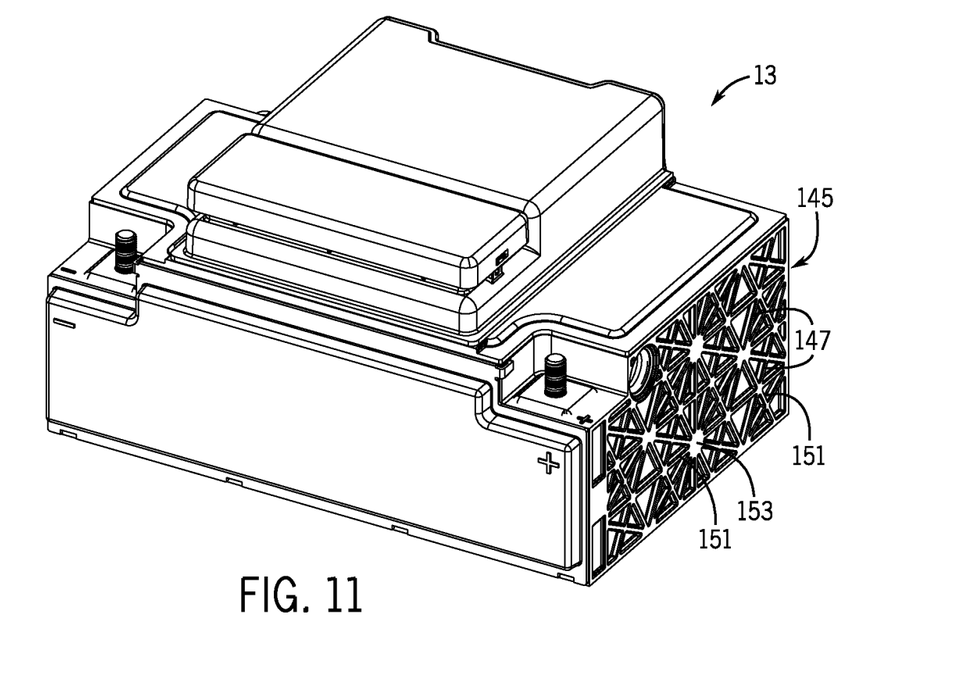
FIG. 11 is a perspective view of the battery module of FIG. 3 in which rigidity features of the housing 31 are exposed, in accordance with an aspect of the present disclosure.

FIG. 11 is a perspective view of an embodiment of a plurality of rigidity features 145 of the side 36 of the housing 31. As shown, the rigidity features 145 are integrated into the side 36 of the housing 31. In the illustrated embodiment, the rigidity features 145 include recessed portions 147 positioned proximate to extended members 151. As shown, the extended members 151 extend laterally away from the recessed portions 147. Furthermore, in certain embodiments, the extended members 151 are configured to couple together at a hub 153. For example, the extended members 151 may form a truss-like configuration (e.g., triangles). As a result, an integral framework of extended members 146 and hubs 148 may be formed in the housing 31. The combination of the recessed portions 147 and the extended members 151 enables the sides 36, 38 to maintain structural rigidity while reducing the overall weight of the sides 36, 38. Moreover, the surface area of the sides 36, 38 is increased because of the configuration of the recessed portions 147 and the extended members 151. As a result, the heat transfer of the housing 31 is improved.

Figure 12:
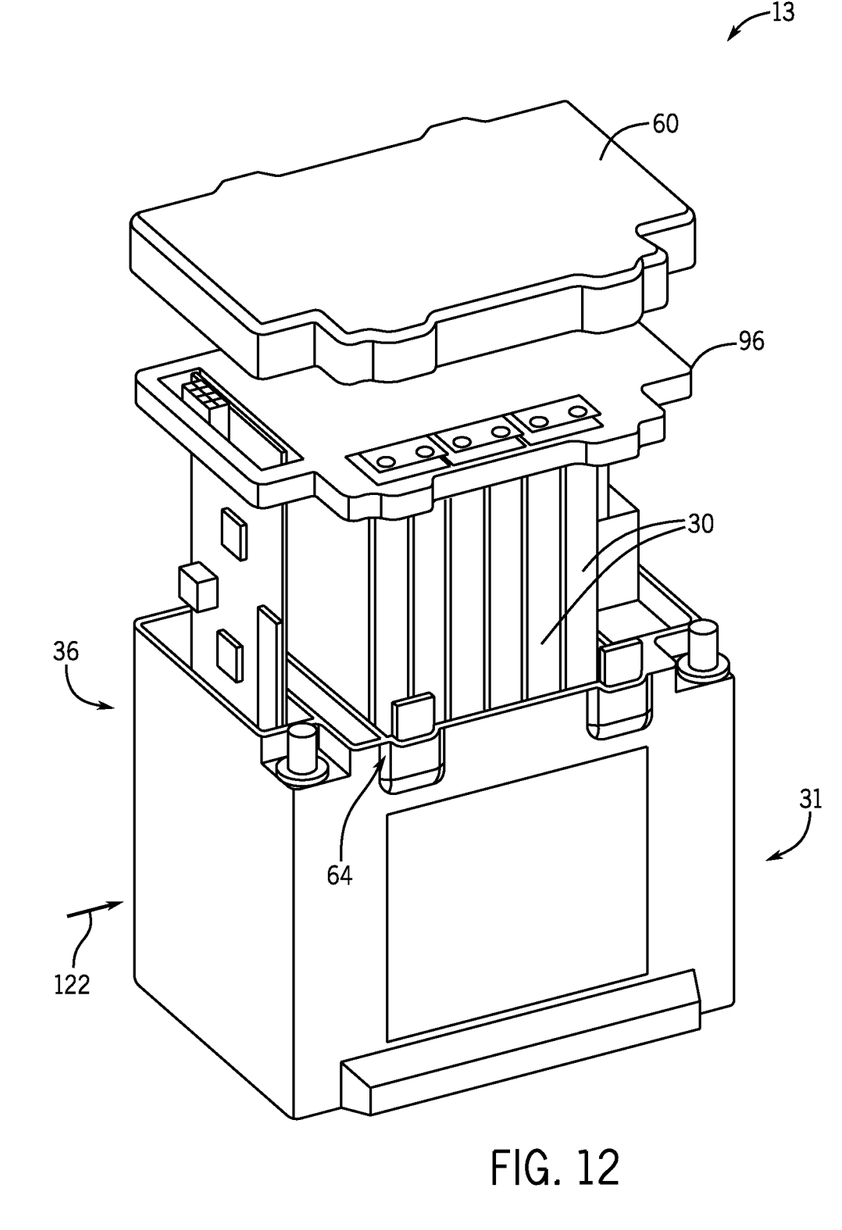
FIG. 12 is a partially exploded perspective view of a battery module, in accordance with an aspect of the present disclosure.

Orientation of the battery module 13 may be particularly selected to anticipate likely external forces. Moreover, the electrochemical cells 30 may also be oriented to anticipate likely external forces. For example, the battery module 13 may be oriented such that the lid 60, e-carrier 48, bus bars 50, and other force sensitive components are arranged at the top side 32 of the battery module 13 because forces applied to the top side 32 of the battery module 13 may be less likely than forces applied to the lateral sides 36, 38, 40, and 42 of the battery module 13. FIG. 12 is an exploded perspective view of the battery module 13 which has the electrochemical cells 30 arranged in an orientation that has terminals of the electrochemical cells 30 pointing in an upward direction. As a result, in embodiments where the force 122 is applied to the side 36 of the battery module 13, the likelihood that the terminals of the electrochemical cells 30 will be exposed to the force 122 is decreased because the terminals are oriented transverse to the force 122. For example, the force 122 may be absorbed by the skeletal frame 64 and the framework 96 before the force 122 impacts the electrochemical cells 30 and, if the electrochemical cells 30 are impacted, the terminals are less likely to be impacted.

Specifically, FIG. 12 is a partially exploded perspective view of the battery module 13 having the electrochemical cells 30 positioned in the upward orientation. As shown, the skeletal frame 64 and framework 96 are positioned to absorb and/or redirect forces applied to the battery module 13. For example, the force 122 applied to the side 36 may be transferred to the skeletal frame 64. Furthermore, the framework 96 is configured to direct forces applied to the lid 60 to the skeletal frame 64, thereby directing the forces away from the electrochemical cells 30. Accordingly, the orientation of the battery module 13 may be particularly set to anticipate external forces such that force sensitive components can be arranged in a manner to preserve the structural integrity of the battery module 13 or electrochemical cells 30.

Figure 13:
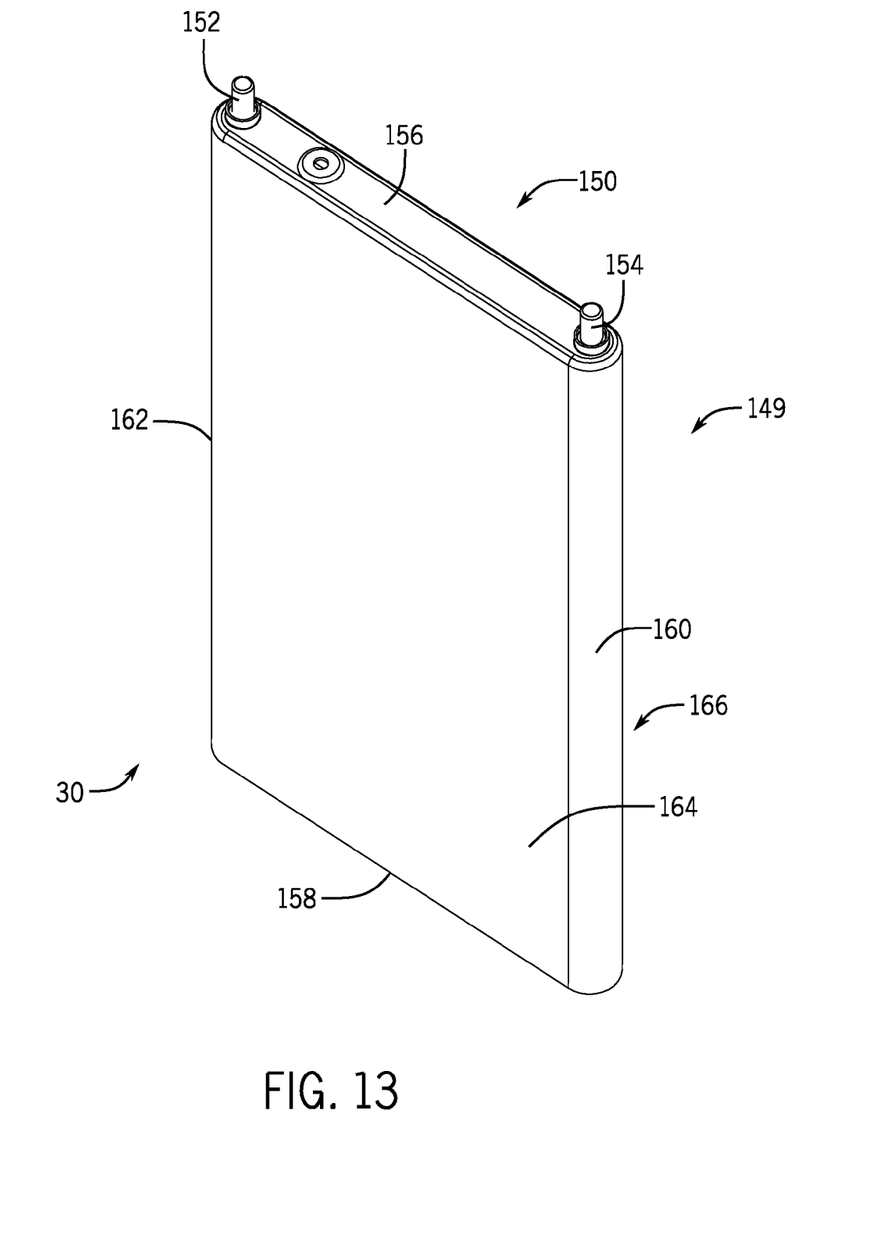
FIG. 13 is a perspective view of a prismatic battery cell used in the lithium ion battery, in accordance with an embodiment of the present approach.

The battery cells 30 described herein may be prismatic battery cells, where a prismatic battery cell, as defined herein, includes a prismatic case 149 that is generally rectangular in shape, as shown in FIG. 13. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion 150, where a set of cell terminals 152, 154 (e.g., positive and negative cell terminals) are located. One or more cell vents 156 may also be located on the top casing portion 150. The prismatic cell casing 149 also includes a bottom casing portion 158 positioned opposite the top casing portion 150. First and second sides 160, 162, which may be straight or rounded, extend between the bottom and top casing portions 150, 158 in respective positions corresponding to the cell terminals 152, 154. First and second faces 164, 166, which may be flat (as shown) or rounded, couple the first and second sides 160, 162 at opposing ends of each cell 30.

As described in detail above, a system for providing structural integrity to a battery module is disclosed. In certain embodiments, the system includes a framework 96 configured to transfer external forces to a skeletal frame 64 of the housing 31. For example, the framework 96 may substantially align with the skeletal frame 64, thereby enabling a transfer of force applied to the framework 96 to the skeletal frame 64. Moreover, in certain embodiments, the framework 96 may be integrated into the e-carrier 48. Furthermore, the cage 128 may substantially surround the housing 31, thereby providing protection from external forces. The cage 128 may include the crush assembly 134 configured to deform when acted upon by the sufficient force. Accordingly, the force may be absorbed by the cage 128 and not transferred to the housing 31. Further, aspects of the cage 128 may be aligned with the battery module 13 such that any force transferred from the cage 128 to the battery module 13 will most likely go into the skeletal frame 64.

While only certain features and embodiments in accordance with the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module comprising:
   a housing;
   a plurality of electrochemical cells positioned in the housing, each electrochemical cell of the plurality of electrochemical cells having a respective terminal end at which at least one terminal is located;
   a skeletal frame coupled with the housing at the terminal ends of the plurality of electrochemical cells; and
   a framework disposed proximate to the skeletal frame such that the skeletal frame is positioned between the terminal ends of the electrochemical cells and the framework, wherein the framework is substantially aligned with the skeletal frame and configured to transfer a force applied to the framework to the skeletal frame, and wherein the framework is formed from a material having a lower modulus of elasticity than the skeletal frame.

2. The battery module of claim 1 comprising a panel coupled to the housing, wherein the framework is integrally formed in the panel.

3. The battery module of claim 1 comprising a front cover disposed proximate to the framework, wherein the front cover is configured to enclose the framework within the battery module.

4. The battery module of claim 1 comprising a carrier having a plurality of bus bars integrated thereon, the carrier being configured to position the plurality of bus bars over the terminal ends of the plurality of electrochemical cells to facilitate electrical connection between the plurality of electrochemical cells, wherein the framework is integrally formed with the carrier.

5. The battery module of claim 1, wherein the framework is positioned within a gap formed between the skeletal frame and a front side of the housing.

6. The battery module of claim 1, wherein the framework is formed from an elastomer, a polymer, a metal, or a combination thereof.

7. The battery module of claim 1, wherein the framework is configured to deform while enclosed within the housing.

8. The battery module of claim 1 comprising a cage configured to surround the housing, wherein the cage is configured to block the housing from external forces.

9. The battery module of claim 8, wherein the cage is configured to couple to the housing and aligned to transfer force to the skeletal frame.

10. The battery module of claim 8, wherein the cage comprises a crush assembly configured to deform when acted upon by a sufficient force, such that the energy from the sufficient force is substantially isolated from the housing.

11. The battery module of claim 2 comprising a housing lip extending beyond a front side of the housing and configured to couple to the panel.

12. The battery module of claim 1, wherein the skeletal frame is configured to provide structural support to the plurality of electrochemical cells.

* * * * *

UNITED STATES PATENT AND TRADEMARK OFFICE
CERTIFICATE OF CORRECTION

| | |
|---|---|
| PATENT NO. | : 9,608,245 B2 |
| APPLICATION NO. | : 14/501971 |
| DATED | : March 28, 2017 |
| INVENTOR(S) | : Richard M. DeKeuster et al. |

It is certified that error appears in the above-identified patent and that said Letters Patent is hereby corrected as shown below:

On the Title Page

1. On Page 2, in item (56), under "U.S. PATENT DOCUMENTS", in Column 1, Line 29, delete "Ura" and insert -- Ura et al. --, therefor.

2. On Page 2, in item (56), under "U.S. PATENT DOCUMENTS", in Column 1, Line 35, delete "Wagner" and insert -- Wagner et al. --, therefor.

3. On Page 2, in item (56), under "U.S. PATENT DOCUMENTS", in Column 2, Line 14, delete "Park" and insert -- Park et al. --, therefor.

In the Specification

4. In Column 1, Line 33, delete "systems" and insert -- electric vehicles --, therefor.

5. In Column 1, Line 37, delete "systems" and insert -- electric vehicles --, therefor.

6. In Column 2, Line 64, delete "DRAWINGS" and insert -- BRIEF DESCRIPTION OF THE DRAWINGS --, therefor.

7. In Column 4, Line 10, delete "manufactures" and insert -- manufacturers --, therefor.

8. In Column 4, Line 13, delete "manufactures" and insert -- manufacturers --, therefor.

9. In Column 9, Line 66, delete "and or" and insert -- and/or --, therefor.

10. In Column 11, Line 2, delete "framework 64" and insert -- framework 96 --, therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,608,245 B2

11. In Column 13, Line 54, delete "crush assembly 34" and insert -- crush assembly 134 --, therefor.

12. In Column 13, Line 56, delete "crush assembly 34" and insert -- crush assembly 134 --, therefor.

13. In Column 14, Line 22, delete "members 146" and insert -- members 151 --, therefor.

14. In Column 14, Lines 22-23, delete "hubs 148" and insert -- hubs 153 --, therefor.

15. In Column 15, Line 17, delete "bottom and top" and insert -- top and bottom --, therefor.